United States Patent [19]
Hedrick

[11] 3,741,352
[45] June 26, 1973

[54] SHAFT BRAKE ASSEMBLY
[75] Inventor: John R. Hedrick, La Crescenta, Calif.
[73] Assignee: Hall International Inc., Santa Barbara, Calif.
[22] Filed: Mar. 31, 1971
[21] Appl. No.: 129,766

[52] U.S. Cl. ................................................ 188/70
[51] Int. Cl. .......................................... F16d 65/24
[58] Field of Search .................................... 188/170

[56] References Cited
UNITED STATES PATENTS
1,561,722   11/1925   Jimerson................................ 188/170
3,599,760   8/1971   Moss...................................... 188/170

Primary Examiner—Richard E. Aegerter
Assistant Examiner—H. S. Lane
Attorney—Smyth, Roston & Pavitt

[57] ABSTRACT

A shaft brake assembly for stopping inertial rotation of a drive shaft wherein a brake shaft is secured against rotational movement by means of a disc, the disc being fixedly secured to a housing, the brake shaft being continuously biased to move into contact with the drive shaft, a piston being movable by fluid pressure to remove the brake shaft out of contact with the drive shaft.

8 Claims, 3 Drawing Figures

PATENTED JUN 26 1973
3,741,352
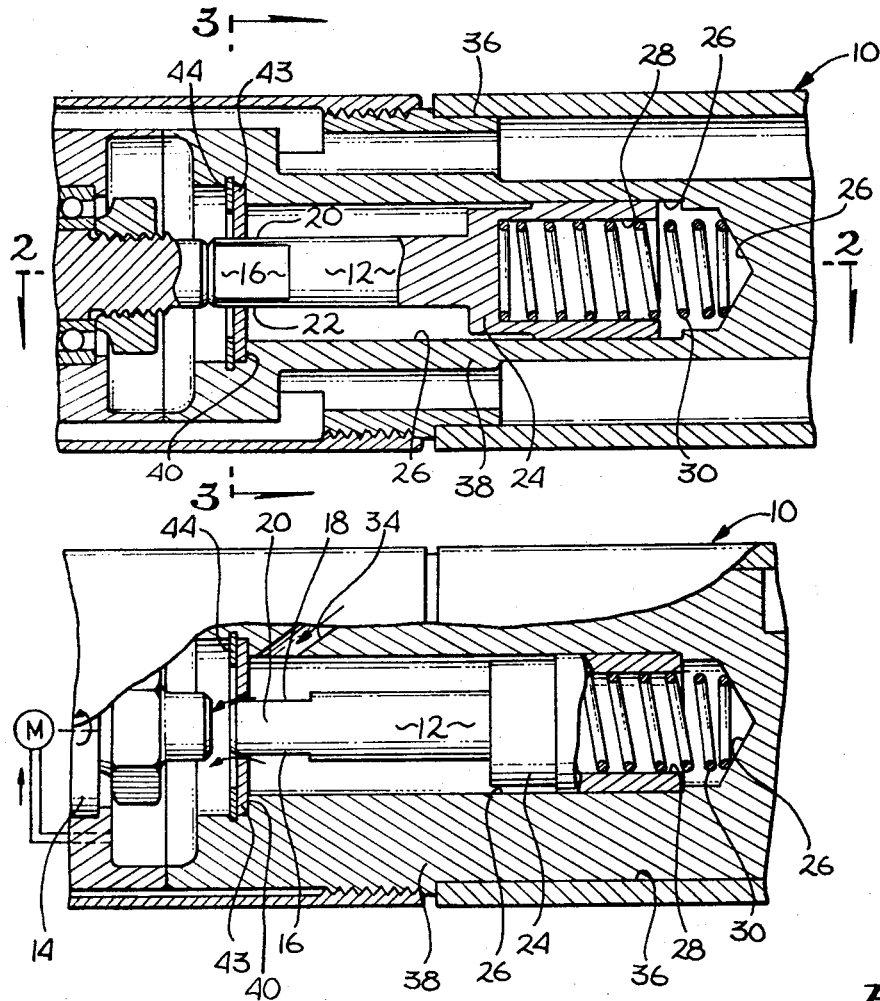
Fig.1
Fig.2
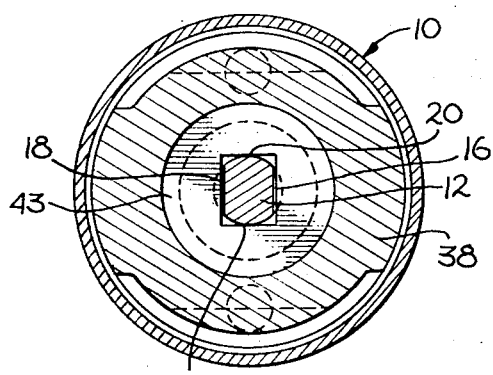
Fig.3
JOHN R. HEDRICK
INVENTOR.
BY *Smyth, Roston & Pavitt*
ATTORNEYS

3,741,352

SHAFT BRAKE ASSEMBLY

BACKGROUND OF THE INVENTION

The field of this invention relates to a brake and more particularly to a brake for a shaft which continues to roate due to inertia afer disconnection of the driving power.

Portable tools are in extremely common use. Such a tool usually takes the form of a hand held drill which includes a motor assembly formed within the drill. For example, dentists normally employ the use of such an apparatus to drill into a person's teeth to permit the insertion of a metallic fitting to eliminate continual tooth decay. Also, in the field of medicine, medical doctors frequently use air driven tools. An example, of a medical type of air driven tool would be an abrasive wheel, which is either electrically or pneumatically driven, usable by surgeons for performing skin grafts.

Such tools that are used by doctors and dentists are frequently employed in situations where a high degree of precision is required. For example, a dentist desires to drill into the person's tooth a specific depth but does not desire to overdrill. For this reason, when the dentist shuts off the drilling mechanism, it is desired that the drilling shaft stop instantly. Similar situations occur in regard to the medical profession.

Also, it is important to effect changing of the tools in a quick manner in certain instances. For instance, the doctor or dentist may be involved in an emergency situation wherein it is not desirable to lose time in the substituting of different tools to the source of pressurized fluid. For that reason, once the tool is shut off, it is undesirable to wait for the tool to quit rotating due to inertia force. Therefore, it is desirable that once the tool is shut down, the tool head immediately stops rotating.

It would be desirable to design a brake for the drive shaft of a rotating tool which was of simple construction yet effected a positive sure brake of the drive shaft when necessary.

SUMMARY OF THE INVENTION

The shaft brake of this invention is designed to be incorporated within a drive shaft driven tool assembly. The shaft brake assembly of this invention is designed to be employed in combination with a pneumatically driven tool wherein the driving fluid pressure is supplied to a piston. The piston is normally biased by a spring assembly in a direction opposite to the fluid pressure. An extension is secured to the piston which is formed of a non-circular configuration such as an eliptical configuration or a polygonal configuration. The forward end of the extension is to function as the braking surface and is adapted, under action of the spring, to come into contact with the free end of the tool drive shaft. The extension is passed through a mating aperture in a disc with the disc being fixedly secured with respect to the shaft brake assembly housing. extension extenion is capable of longitudinal movement with respect to the disc into engagement with the shaft and out of engagement with the drive shaft.

BRIEF DESCRIPTION OF THE DRAWING

FIG. 1 is a longitudinal cross sectional view of the brake assembly of this invention showing the shaft brake in the braking position;

FIG. 2 is a cross sectional view taken along line 2—2 of FIG. 1 but showing the shaft brake in the non-braking position; and FIG. 3 is a sectional view taken along line 3—3 of FIG. 1 showing in greater detail the disc employed within this invention to prevent rotational movement of the brake shaft.

DETAILED DESCRIPTION OF THE SHOWN EMBODIMENT

Referring particularly to the drawing there is shown in FIG. 1 a shaft brake assembly 10 of this invention including a brake shaft 12 which is to function to be movable into contact with a tool drive shaft 14. It is to be understood that the tool drive shaft 14 is to be rotated by a motor assembly not shown, such motor assembly being conventional and forming no specific part of this invention. The forward end of the brake shaft is formed, in cross sectional configuration, into flattened sides 16 and 18 with rounded ends 20 and 22. It is to be understood that although this particular configuration is desirable, this invention is not to be limited thereto. A polygonal configuration such as a square shape or octagonal shape would also be satisfactory. However, it is important that the configuration of this end of the brake shaft 12 be non-circular.

The brake shaft 12 is integrally secured to a piston 24. Piston 24 is located within a chamber 26 and capable of axial movement therein. Piston 26 is formed of a substantially hollow interior forming a spring retaining chamber 28. A spring 30 is to be located within the chamber 28 and is adapted to contact the closed end 32 of the chamber 26.

Fluid under pressure, which would normally be air, is to be supplied through orifice 34 from the main fluid supply passage (not shown). It is to be noted that the fluid is to be supplied at the front end of chamber 26 so as to react against the head of the piston 24 and tend to move the piston 24 against the action of the compression spring 30.

The piston 24 is supported within the housing 38. Housing 38 also includes a shoulder 40 which is adapted to receive a disc 43 located in abutting contact therewith. It is to be noted that the disc 43 is circular in outer configuration but includes an aperture therein which is to matingly cooperate with the non-circular configuration of the brake shaft 12. The disc 43 is to be fixedly retained with respect to the housing by means of snap ring 44. It is to be further noted that the brake shaft 12 is capable of longitudinal movement with respect to the disc 43. However, because of the non-circular mating aperture of the disc 43, rotational movement of the brake shaft 12 with respect to the disc 43 is prevented.

It is desired that the disc 43 be constructed of a particular type of plastic material commonly referred to by the trade name of "Teflon". Such a disc permits low frictional movement of the shaft 12 with respect to the disc 43. Also, such a disc functions to damp vibrations which may occur during the braking procedure. It is common for the shaft to rotate at a velocity of 100,000 rpm. To brake from such a velocity quickly, normally causes rapid transverse movement of the shaft 12. This transverse movement can cause premature failure of certain parts as well as exhibiting a most undesirable noise. The plastic disc 43 effectively damps these vibrations and eliminate the noise associated therewith.

Additionally, a predetermined amount of space exists between the shaft 12 and the disc 43. This space is to permit conducting of the pressurized fluid from chamber 26 to drive the motor assembly (not shown).

The operation of the shaft brake assembly of this invention is as follows: It will be presumed that the shaft brake assembly of this invention is in the non-braking position shown in FIG. 2 of the drawing. In that position fluid pressure within the fluid supply passage is transmitted through orifice 34 into chamber 26 and reacts against piston 24. As a result, piston 24 is moved within chamber 26 to compress spring 30 and to displace the brake shaft 12 from the drive shaft 14. In this position the drive shaft 14 is free to rotate in an unhindered manner.

Let it be assumed that the operator shuts off the supply of pressurized gas which drives motor assembly driving the drive shaft. The gaseous fluid under pressure is no longer being supplied within chamber 26, permitting the biasing force caused by spring 30 to move the piston 24 toward the front end of chamber 26. As a result, the brake shaft 12 is moved into contactual relationship with the drive shaft 14. Spring 30 also provides sufficient force to provide sufficient frictional resistance of the brake shaft when coming into contact with the drive shaft 14. Rotation of the brake shaft 12 with respect to the housing 38 is prevented by means of disc 43. Disc 43 is fixedly secured to the housing 38 by means of snap ring 44. Formed within the disc 43 is a non-circular aperture which cooperates with the non-circular configuration of the brake shaft 12, thereby preventing rotation of the brake shaft 12 with respect to the housing 38.

What is claimed is:

1. An assembly to brake a fluid motor driven drive shaft against rotation thereof comprising:
   a housing in which said drive shaft is rotatably mounted,
   a brake shaft fixedly mounted in said housing,
   means for biasing said brake shaft into frictional engagement with said drive shaft to exert a braking action on said drive shaft,
   fluid actuated means for biasing said brake shaft away from frictional contact with said drive shaft,
   means for transferring fluid from said fluid actuated means to the motor which drives said drive shaft,
   means fixedly secured to said housing and operatively associated with said brake shaft for preventing rotation of said brake shaft with respect to said housing,
   said last mentioned means including a disc, said disc having a noncircular aperture therein, said brake shaft extending through said aperture, that portion of said brake shaft extending through said aperture having at least a partially complementary periphery thereon,
   a space within said aperture located between the periphery of said brake shaft and the rim of the aperture of said disc, said space comprising at least a portion of said transferring means, and
   said disc being formed of a plastic material exhibiting low frictional characteristics to movement between said disc and said brake shaft to damp vibration of said shaft.

2. An apparatus for braking a fluid operated motor comprising:
   means defining a chamber having an inlet for admitting fluid under pressure to said chamber and an outlet for exhausting fluid from said chamber whereby fluid can flow through said chamber from said inlet to said outlet,
   means for conducting the fluid from said outlet to the fluid operated motor to drive said motor,
   a rotatable element rotatable by the fluid operated motor,
   a brake member,
   means for mounting the brake member for movement into and out of engagement with the rotatable element,
   means for biasing the brake member into engagement with said rotatable element, and
   means responsive to the fluid in said chamber being of at least a predetermined pressure for holding said brake member substantially out of contact with said rotatable element.

3. An apparatus for braking a fluid operated motor comprising:
   means defining a chamber,
   conducting means connectible to a source of fluid under pressure and to the fluid operated motor for conducting fluid under pressure from said source through at least a portion of said chamber to the motor to drive the motor,
   a brake member,
   a rotatable member rotatable by the fluid operated motor,
   means for mounting one of said members for movement into and out of engagement with the other of said members,
   yieldable means for urging said one member into braking contact with the other of said members to cause a braking force to be applied to said rotatable member, and
   a fluid responsive member at least partially in said chamber and responsive to the pressure in said chamber being at least a predetermined magnitude for urging said one member out of braking contact with said other member.

4. An apparatus for braking a fluid operated motor comprising:
   a housing,
   a rotatable element,
   means in said housing for mounting said rotatable element for rotation by the motor,
   a brake member,
   a piston coupled to said brake member,
   means in said housing defining a chamber,
   said piston and brake member being at least partially mounted in said chamber for movement together,
   said brake member being movable generally axially into and out of braking contact with the rotatable element,
   means for substantially preventing rotation of said brake member,
   biasing means in said housing, and
   conducting means connectible to a source of fluid under pressure and to the fluid operated motor for conducting fluid under pressure through at least a portion of said chamber to the motor to drive the motor.

5. An apparatus for braking a fluid operated motor comprising:

conducting means connectible to a source of fluid under pressure and to the fluid operated motor for conducting fluid under pressure to the fluid operated motor to drive the motor, a rotatable element rotatable by the fluid operated motor, a brake member, means for mounting said brake member for movement into and out of engagement with said rotatable element, yieldable means for urging the brake member into contact wtih the rotatable element to apply a braking force thereto, a fluid responsive member responsive to a predetermined condition of the fluid in the conducting means for urging said brake member out of contact with said rotatable element, and at least a portion of at least one of one of said members being positionable in said conducting means.

6. An apparatus as defined in claim 5 wherein at least a portion of said brake element is positioned in said conducting means.

7. An apparatus as defined in claim 5 including means defining an aperture through which the brake member extends, the aperture and the cross section of said brake member being configured to prevent rotation of the brake member.

8. An apparatus as defined in claim 7 wherein said aperture defining means includes a disc, the clearance between the rim of the aperture and the brake member forming a portion of said conducting means.

* * * * *